United States Patent [19]

Kuhnle

[11] 4,017,177

[45] Apr. 12, 1977

[54] PHOTOSETTER

[75] Inventor: Siegfried Kühnle, Stuttgart, Germany

[73] Assignee: H. Berthold A.G., Germany

[22] Filed: June 2, 1975

[21] Appl. No.: 582,636

[52] U.S. Cl. .................................. 355/43; 352/90; 354/5; 355/46

[51] Int. Cl.[2] .................. G03B 27/52; G03B 27/70

[58] Field of Search ............. 354/5; 355/40, 43, 46; 352/90, 91

[56] References Cited

UNITED STATES PATENTS

| | | | |
|---|---|---|---|
| 2,964,995 | 12/1960 | Tondreau | 355/40 X |
| 3,040,619 | 6/1962 | Oxberry | 355/46 |
| 3,480,362 | 11/1969 | Dejoux | 355/40 |
| 3,580,666 | 5/1971 | Vance | 355/43 X |
| 3,682,540 | 8/1972 | Oxberry et al. | 355/46 X |

*Primary Examiner*—Richard A. Wintercorn
*Attorney, Agent, or Firm*—James E. Nilles

[57] ABSTRACT

A photosetter comprises a main projection system having a projection objective for projecting a type image from an object plane onto a setting plane. The image at the object plane is provided either by a type carrier film located in the object plane, or, alternately or simultaneously, by an intermediate image projected from a film in a remotely located auxiliary projection system. Each projection system may comprise its own light source and condenser, or the light source for the auxiliary system can be used for both systems. In one embodiment, a movable mirror is used to direct the intermediate image to the object plane. Furthermore, the auxiliary projection system may include means for changing the size or distorting the intermediate image.

7 Claims, 3 Drawing Figures

PHOTOSETTER

BACKGROUND OF THE INVENTION

1. Field of Use

This invention relates to a photosetter having a projection system including a projection objective, by means of which a type image on a type carrier located in an object plane is projectable onto a setting plane and further having an optionally usable auxiliary projection system whereby another type image on a film is projectable as an intermediate image to the object plane from whence it is projected onto the setting plane by said projection objective.

2. Description of the Prior Art

The type carriers of prior art display photosetters are constructed either as strip-type or round plates having appropriate type images (hereafter called type) thereon. Since a multitude of different type styles and characters exist, many of these expensive plates must be acquired. In order to reduce the financial burden, relatively inexpensive films with images of the various type styles and characters (hereafter called type) thereon are also available. These films can be used for setting with the prior art photosetter machines by inserting into the machine an auxiliary unit containing the film depicting the appropriate type. The auxiliary unit contains one unwind and one rewind reel, between which the film can be rewound. In prior art machines this is done in such a way that the plate-type carrier is removed from the machine and the auxiliary unit is inserted into the machine in place thereof as an added component, so that the film is located in the space normally occupied by the type carrier. This procedure is relatively cumbersome. In addition, it has the disadvantage that the normally available size variation range of the projection system cannot be utilized. The type on these films is generally so big that a reduction is only possible by means of the projection system of the prior art photosetters. Furthermore, only type from the film or from the type plate can be projected at any one time.

SUMMARY OF THE PRESENT INVENTION

The present invention has for its purpose the provision of a photosetter generally of the above-described character but wherein simplified handling of components, mixed projection of type carrier type and film type, and utilization of the size variation range of the projection system are possible.

This purpose is achieved in accordance with the invention by placing the auxiliary unit in a photosetter machine at some distance from the location of the type carrier, and by providing an auxiliary projection system in the auxiliary unit by means of which an intermediate image of the film can be created on the object plane at the location of the type carrier; so that this intermediate image, in turn, can be projected onto the setting plane by the projection objective.

In a photosetter in accordance with the invention, the film does not physically replace the type carrier. Rather, the auxiliary unit in the photosetter is provided at a distance from the location of the type carrier and the type located on the film is projected as an intermediate image onto the object plane at the location of the type carrier by means of an auxiliary projection system and from thence to the setting plane. Consequently, the auxiliary unit does not have to be exchanged with the type carrier. This leads to a structural simplification.

Furthermore, it is possible to simultaneously project the film type as well as the carrier type onto the setting plane, which makes mixed projections possible. For example, a screen can be provided in the type carrier, which is projected onto the setting plane simultaneously with the film type. Other effects can be achieved by such mixed projection. Since the size of the intermediate image can easily be made to correspond to the normal type size on the type carriers, the size variation range of the photosetter's projection system can also be effectively utilized to increase and decrease type size on the setting screen. For example, it is possible to use films with type of a useful height up to 20 mm whereas the photosetter otherwise only uses a type plate with a useful type height of 5–7 mm.

It is preferable, for the above-mentioned reasons, to design the auxiliary projection system in such way that it reduces the film type on the object plane to a degree which essentially corresponds to the size of the type normally located on the type carriers.

It is practical to make the reduction factor of the auxiliary projection system adjustable. This permits intermediate images of any desired size, which can then be further reduced or enlarged by the projection system and also distorted by means of known conventionaldistortion devices.

Depending on the size of the intermediate image and the light intensity of the objectives used, it may be practical to provide the auxiliary projection system with a field lens.

In a construction variation of the photosetter in accordance with the invention, the projection system contains a swivel mirror, located in the trace or path of the projection rays in front of the type carrier, which swivel mirror in its ON position directs the projection ray trace to the type carrier and in its OFF position permits the trace of the auxiliary projection system to pass to the location of the type carrier. When the swivel mirror is swung away to OFF, the trace of the rays of the auxiliary projection system is aligned with the projection objective of the normal projection system.

However, the photosetter can be designed in such a way that the auxiliary projection system functions as the source of light for the projection system and the film can be removed from the auxilary unit. In this case the auxiliary projection system always serves as the light source of the projection system, so that the latter does not require a lamp of its own. However, in this case it must be possible to remove the film from the auxiliary unit at any time, so that adequate lighting is assured when only the type carrier is used.

DRAWINGS

FIGS. 1*a* and 1*b* illustrate the principles of the invention and

FIG. 2 is a schematic diagram of a photosetter according to the invention.

DESCRIPTION OF PREFERRED EMBODIMENTS

Figures 1A, 1B:
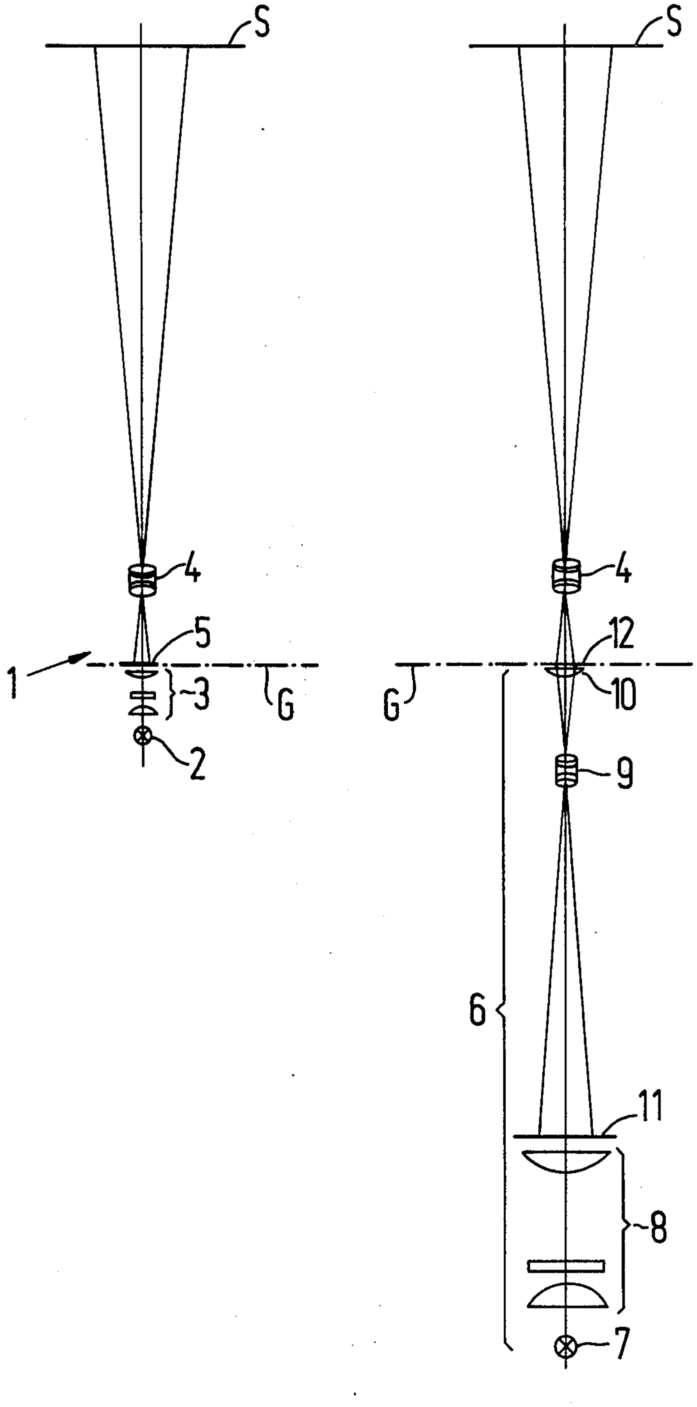
PRIOR ART Fig. 1a

FIG. 1*a* shows a projection system 1 of a prior art photosetter which comprises a lamp 2, a condenser 3 and a projection objective 4. The projection system 1 is used to project type located on a type carrier 5 from an object plane G in which type carrier 5 lies onto a setting plane S. The projection ray trace can be seen in FIG. 1*a*.

FIG. 1*b* shows an auxiliary projection system 6 comprising a lamp 7, a condenser 8, an auxiliary objective 9 and a field lens 10. With auxiliary projection system 6 an intermediate image 12 of type located on a film 11 is produced in the object plane G. The previously mentioned projection objective 4 projects the intermediate image 12 onto the setting plane S. The auxiliary projection system 6 virtually 'replaces' the type carrier 5 and creates an intermediate image 12 of the type located on film 11 in place of the type located on the type carrier 5. The intermediate image 12 is then projected onto the setting plane S in the same way as the type of the type carrier 5.

Figure 2:
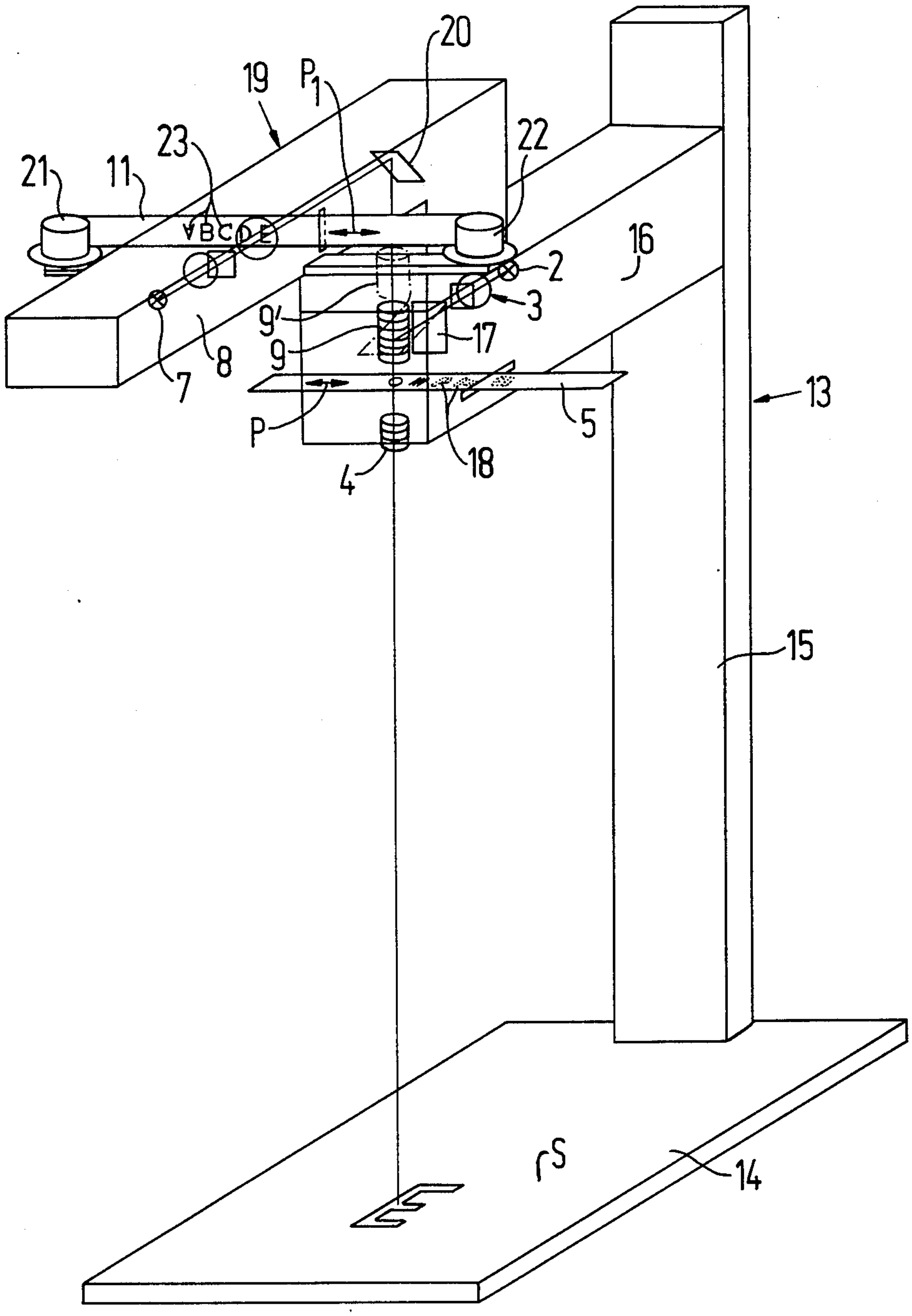

FIG. 2 of the drawing of a photosetter 13 according to the invention also shows the optical components explained in connection with FIGS. 1*a* and 1*b* and employs the same identification numbers which need not be explained again in detail.

FIG. 2 shows that the photosetter 13 has a composing table 14, which is normally designed as a mechanical stage and defines the setting plane S. A vertical column 15 supports a projection head 16, having suitable known height adjustment means (not shown), which contains or embodies the projection system 1 including components 2, 3, and 4. The trace of the projection rays from condenser 3 in the photosetter 13 shown in FIG. 2 is deflected by means of a swivel deflection mirror 17 which is inserted between the condenser 3 and the projection objective 4. In its ON position (shown by dotted lines) the mirror 17 deflects the trace of the projection rays coming from the lamp 2 downward onto the type carrier 5. The type 18 located on the type carrier 5 can be aligned with the trace of the projection rays by traversing or adjusting the type carrier 5 in the directions of the arrow P, as required. However, a round plate type carrier (not shown) can also be used instead of a strip type carrier and the type to be projected is then aligned with the trace of the projection rays by rotating the plate.

An auxiliary unit 19, which is permanently installed in, or detachable from, the device 13, contains components 7 and 8 of the auxiliary projection system 6 and a deflecting mirror 20. In addition, the auxiliary unit 19 contains an unwind reel 21 and a rewind reel 22 (exchangeable), between which the film 11 with the type 23 thereon can be shifted by rotating one of the reels. FIG. 2 of the drawing shows that by shifting the film 11 in the directions arrow $P_1$ one of the characters 23 can in each case be aligned with the trace of the rays of the auxiliary projection system 6. The ray trace then arrives at the auxiliary projection objective 9 via the deflecting mirror 20. The projection objective 9 is located in the head 16. If the swivel mirror 17 is in the OFF position (shown by solid lines), the trace of the rays goes on from the auxiliary projection objective 9 to the projection objective 4, between which the abovementioned intermediate image 12 is created in the object plane at the location of the type carrier 5.

The type carrier 5 may either be completely removed, so that only the type 23 from the film 11 is projected, or the type carrier may be allowed to remain in the ray trace, which creates a mixed projection.

The auxiliary projection objective 9 is adjustable to another position, as shown in the drawing at 9' by a dotted line, so that the size of the intermediate image 12 can be varied. The projection size on the setting planes, on the other hand, can be varied by adjusting the projection objective 4.

In place of its own light source 2, with condenser 3 and swivel mirror 17, the photosetter 13 can be lighted by means of the lamp 7 in the auxiliary projection system 6 when projecting from the type carrier 5 only. However, in this case it is necessary to remove the film 11 completely from the trace of the rays of the auxiliary projection system. On the other hand, this eliminates several construction components from the projection system.

In addition, the auxiliary projection system 6 can be arranged differently relative to the location of the type carrier 5 than shown in FIG. 2. It is merely essential that the film 11 and the type carrier 5 can be disposed in the device simultaneously and that the film 11 is installed in such a way that the auxiliary projection system 6 creates an intermediate image 12 of its type in object plane G at the location of the type carrier 5.

I claim:

1. In a photosetter having a type carrier located in an object plane and a projection system with a projection objective by means of which type of said type carrier is projectable onto a setting plane spaced from said object plane; an auxiliary projection system having a film therein and located at a distance from said object plane by means of which an intermediate image of type on said film can be created at said object plane for projection onto said setting plane by said projection objective, said auxiliary projection system comprising an adjustably movable field lens for changing the size of said intermediate image at said object plane to correspond to the size of the type of said type carrier.

2. A photosetter having a type carrier located in an object plane and a projection system with a projection objective by means of which the type of said type carrier is projectable onto a setting plane spaced from said object plane; and an optionally usable auxiliary unit located at a distance from said type carrier, said auxiliary unit having a film therein and comprising an auxiliary projection system by means of which an intermediate image of the type located on said film can be created at said object plane at the location of said type carrier, which intermediate image can in turn be projected onto said setting plane by means of said projection objective, said auxiliary projection system including adjustable means to reduce the size the type projected as said intermediate image from said film to a degree which essentially corresponds to the size of the type located on said type carrier.

3. A photosetter according to claim 2, characterized by the fact that said auxiliary projection system contains a field lens in said means to reduce the size of type projected on said intermediate image.

4. In a photosetter for selectively projecting type from a type carrier and from a film, individually or simultaneously, onto a setting plane; an object plane spaced from said setting plane; a projection objective located between said planes; means for supporting a type carrier in said object plane; first means for effecting projection of an image of type on said type carrier through said projection objective onto said setting plane; means for supporting a film in a position remote from said object plane; and second means in a position remote from said object plane for effecting projection of an intermediate image of type on said film to said object plane and from thence through said projection objective to said setting plane, said second means including an adjustably movable field lens for changing the size of the intermediate image of type at said object plane to correspond to the size of type of said type carrier.

5. A photosetter according to claim 4 wherein said means for effecting projection of said image of type from said type carrier comprises a first source of light and a first condenser disposed between said first source of light and said object plane; and wherein said means for effecting projection of an intermediate image of type from said film comprises a second source of light, a second condenser disposed between said second source of light and said film, an auxiliary objective disposed between said film and said object plane, and a field lens disposed between said film and said object plane.

6. In a photosetter for selectively projecting images of type from a type carrier and from a film, individually or simultaneously, onto a setting plane; an object plane spaced from said setting plane; a projection objective located between said planes; means for supporting a type carrier in said object plane; first means for effecting projection of an image of type on said type carrier through said projection objective onto said setting plane, said first means comprising a first source of light and a first condenser disposed between said first source of light and said object plane; means for supporting a film in a position remote from said object plane; and second means in a position remote from said object plane for effecting projection of an intermediate image of type on said film to said object plane and from thence through said projection objective to said setting plane, said second means comprising a second source of light, a second condenser disposed between said second source of light and said film, an auxiliary objective disposed between said film and said object plane, and a field lens disposed between said film and said object plane; said auxiliary objective and said projection objective being in axially aligned spaced apart relationship with each other on an axis, wherein said object plane intersects said axis, wherein radiation from said first source of light and said first condenser is normal to said axis, and including an adjustably movable mirror movable between one position on said axis wherein it directs radiation from said first condenser through said object plane and through said projection objective and another position away from said axis wherein it permits radiation from said auxiliary objective through said object plane to said projection objective.

7. A photosetter according to claim 6 including a field lens disposed between said film and said object plane.

* * * * *